US006270812B1

(12) United States Patent
Allen et al.

(10) Patent No.: US 6,270,812 B1
(45) Date of Patent: Aug. 7, 2001

(54) REDUCING *E. COLI* CONTENT OF BEEF

(75) Inventors: Vivian Gore Allen, Lubbock; Kevin R. Pond, Wolfforth, both of TX (US)

(73) Assignee: Texas Tech University, Lubbock, TX (US)

( * ) Notice: Subject to any disclaimer, the term of this patent is extended or adjusted under 35 U.S.C. 154(b) by 0 days.

(21) Appl. No.: 09/494,349

(22) Filed: Jan. 31, 2000

(51) Int. Cl.$^7$ ....................................................... A23K 1/14
(52) U.S. Cl. .............................. 426/2; 426/635; 426/636; 426/655; 426/807
(58) Field of Search ................................ 426/2, 636, 635, 426/655, 807

(56) References Cited

FOREIGN PATENT DOCUMENTS

626884 * 1/1963 (BE) .

OTHER PUBLICATIONS

Okai, Y., et al., J. Sci. Food Agric. 72, 455–460 1996.
Okai, Y., et al., J. Sci. Food Agric. 76, 56–62 (1998).
Woodward, L., Vistas, Texas Tech Research, Fall 1999, vol. 8, No. 1, pp 20–25.
Saker, K. E., et al., J. Anim. Sci. 76, 2694–2700 (1998).
Kim, C. S., et al., The Effect of Dietary Sargassum–Natans and Ascophyllum–Nodosum on Salmonella Gallinarum Infection in Chicks, BIOSIS (AN 1969:8848).
Herskoviz, R., et al., Differential effects of Polysulfated polysaccharide on experimental encephalomyelitis, proliferation of autoimmune T cells, and inhibition of heparanase activity, BIOSIS (AN 1996:22174).
Matsuzaki, S., et al., Application of seaweeds to human nutrition and medicine CA (AN97:4974) 1997.
Nishizawa, K., Seaweed as food for controlling diseases in elderly patients, CAPLUS (AN 1998:590009).
Kim, C. S., The Effects of Dietary Sargassum–Natans and Ascophyllum–Nodosum on Salmonella–Gallinarum Infection in Chicks, BIOSIS (AN 1973:82740).
Charreau, B., et al., Efficiency of fucans in protecting porcine endothelial cells against complement activation and lysis by human serum, BIOSIS (AN 1997:190627).
Blondin, C., et al., Relationships between chemical characteristics and anticomplementary activity of fucans, BIOSYS (AN 1996:188236).
Ren, D., et al., Study on Antihypertensive and Antihyperlipidemic Effects of Marine Algae, BIOSIS (AN 1994:487915).
Klinger, M. M., et al., Anti–HIV Activity of Sulfated Polysaccharides from the Brown Seaweed Ascophyllum nodosum, DRUGU M (AN 91–25081) 1991.
Blunden, G., et al., Medicinal and Pharmaceutical Uses of Algae, DRUGU TMPS (AN 87–01915) 1987.

Product and Technical Information, Ascophylluns nodosum Kelp Meal and Flour, Acadian Seaplants Limited, Nova Scotia, Canada (Jan. 10, 1998).
Information Sheet on Acadian Seaplants Seaweed Extract, Acadian Seaplants Limited, Nova Scotia, Canada, Jan. 8, 1998.
Information Sheet titled Product and Technical Information, General Home and Garden Use, Acadian Seaplants Limited, Nova Scotia, Canada (Sep. 5, 1998).
Schmidt, R. E., et al., Proc. 1997 Amer. Forage and Grassl. Counc., Georgetown. TX, 6:158–162.
Coelho, R. W., et al., Proc. 1997 Amer. Forage and Grassl. Counc., Georgetown, TX, 6:163–167.
Allen, V. G., et al., Proc. 1997 Amer. Forage and Grassl. Counc., Counc., Georgetown, TX, 6:168–172.
Saker, K. E., et al., Proc. 1997 Amer. Forage and Grassl. Counc., Georgetown, TX, 6:178–182.
Fike, J. H., et al., Proc. 1997 Amer. Forage and Grassl. Counc., Georgetown, TX, 6:153–157.
Vacca, D. D., et al., Journal of the American Pharmaceutical Association, vol. XLIII, No. 1, pp 24–26 (1954).
Hobbs, D., The New Farm May/Jun. 1994, 26–28.
Klober, K., Small Farm Today, Aug. 1996, p. 10.
Morrison, F. B., Fields and Feeding, The Morrison Publishing Company, Ithaca, NY (1957), p.554.
Dennis, S. B., et al., J. Anim. Sci. 76, 2687–2693 (1998).
Fike, J. H., Masters Thesis titled Influence of Seaweed Extract and Other Plant Growth Regulators on Growth, Persistance and Quality of Tall Fescue and Their Potential to Alleviate Tall Fescue Toxicity to Livestock (1995).
Sen, T. L., Seaweed and Plant Growth (1987), pp 7–4, 7–5.
Buttery, S., Influence of Acremonium Coenophialum on Fescue Arundinacea Growth, Chemical Composition, Digestibility and Tall Fescue Toxicities; Ph.D. dissertation, 1989, abstract and pp 36, 84 and 86.

* cited by examiner

*Primary Examiner*—Chhaya D. Sayala

(57) ABSTRACT

A method of obtaining beef of reduced pathogenic *E. coli* content comprises the step of directly feeding seaweed supplement to cattle during the feedlot finishing period or grazing cattle on forage on or into which seaweed supplement has been incorporated. Beef and beef products of improved safety are the result.

16 Claims, 4 Drawing Sheets

REDUCING E. COLI CONTENT OF BEEF

TECHNICAL FIELD

This invention relates to a method of producing beef of reduced pathogenic E. coli content.

BACKGROUND OF THE INVENTION

Beef is typically obtained from cattle (beef cattle or dairy cattle) that have grazed in pastures and have fed in feedlots. About 18 to 24 months after birth, the animals are slaughtered and primal cuts are obtained.

The bacterium E. coli is a natural inhabitant of the gastrointestinal (GI) tract of most warm-blooded animals, including man and cattle. Over 200 serotypes or strains of E. coli have been identified, and most are non-pathogenic. In 1971, however, E. coli was first recognized as a cause of food borne illness in the United States when contaminated imported cheese caused diarrheal disease in about 400 individuals. Evidence that certain strains of E. coli were associated with human disease grew, and now five classes of "enterovirulent" E. coli are recognized as food borne pathogens causing diseases ranging from traveler's diarrhea to the potentially deadly hemorrhagic colitis/hemolytic uremic syndrome. Red meat (including beef) and poultry have been implicated as prominent sources of enterovirulent E. coli. One strain of enterovirulent E. coli is O157:H7. Presence of this specific strain is considered as an adulterant by the USDA.

At slaughter of cattle, the carcases are inspected and graded and tested for Eschericia coli O157:H7 (E. coliO157:H7) content on a random basis. Ground beef is also randomly tested specifically for E. coliO157:H7. Meat found with E. coli O157:H7 is not suitable for human consumption and is destroyed. Meat found negative for E. coliO157:H7 and with an acceptable level of E. coli content or which were not tested for E. coli content is usually vacuum packaged to preserve freshness, and the packaged meat is sent to supermarkets or other meat distribution businesses where the vacuum packaging is removed and the meat is repackaged or displayed in a case for sale, or cuts are converted into ground meat or cut into smaller cuts which are repackaged or displayed in a case for sale.

We turn now to approaches for reducing the pathogen content of beef One approach in the battle against food borne pathogens is to reduce the occurrence of these pathogens at the farm Many food borne pathogens (including E. coliO157:H7) are inhabitants of the GI tract and feces of cattle. During slaughter and processing, fecal contaminants from the hide, hair and hooves can be transferred to the carcass, and in current processing schemes there is no foolproof means of eliminating these pathogens from raw meat products. Since the origin of these pathogens tends to be the GI tract, it is thought that by manipulating animal feed, the environment of the gut can be altered to enhance the growth of healthy non-pathogenic bacteria in the gut, and/or minimize or eliminate the presence of pathogens; this approach has not been entirely successful.

SUMMARY OF THE INVENTION

It is conceived herein that a heightened immune response could have a positive impact on microflora in the gut and that administration of seaweed supplement as a result of causing heightened immune response or otherwise (e.g., direct toxicity to E. coli microbes) will result in production of beef with reduced pathogenic E. coli content thereby improving the safety of beef and beef products.

One embodiment of the invention herein is directed to a method of obtaining beef of reduced pathogenic E. coli content and comprises the steps of: (a) directly feeding seaweed supplement to cattle during the feedlot finishing period of the life cycle of beef production; (b) slaughtering the cattle and obtaining meat; and (c) analyzing for pathogenic E coli content in samples of the meat; thereby to obtain and demonstrate the presence of beef of reduced pathogenic E. coli content compared to if seaweed supplement were not fed.

Another embodiment of the invention herein is directed to a method of obtaining beef of reduced pathogenic E. coli content comprising the steps of (a) grazing cattle on forage on or into which seaweed supplement has been incorporated; (b) slaughtering the cattle and obtaining meat; and (c) analyzing for pathogenic E. coli content in samples of the meat; thereby to obtain and demonstrate the presence of beef of reduced pathogenic E. coli content compared to if seaweed supplement were not fed.

The term "meat" is used herein to include primal cuts as well as smaller cuts, including ground meat.

DETAILED DESCRIPTION OF THE INVENTION

Figure 1:
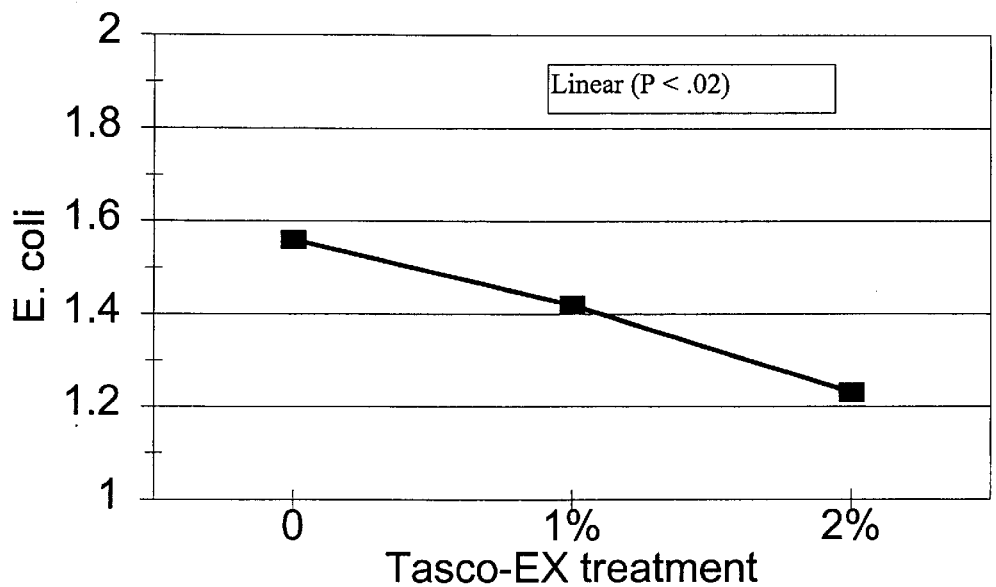
FIG. 1 is a graphic presentation of effect of feeding of seaweed extract on fecal E. coli content and shows results of Example I.

In both of the embodiments herein, the cattle can be beef cattle or dairy cattle that are not used for milk production or breeding purposes or can be cull cows from breeding herds and milking herds.

We turn now to the seaweed supplements for the two embodiments.

The seaweed supplement is, for example, seaweed extract or seaweed meal.

The seaweed from which the seaweed supplement is obtained can be from any of the various seaweed plant classifications, preferably those that have been utilized in agriculture and include seaweeds from the plant orders Laminariaceae, Fucaceae and Gigartinaceae. Genus groups include Ascophyllum, Laminaria, Durvillea, Macrocystis, Chondrus and Ecklonia. The seaweed for the preferred seaweed supplement herein is from the genus Ascophyllum which belongs to the order Fucaceae and is Ascophyllum nodosum. Ascophyllum nodosum is a brown seaweed which grows along the North Atlantic shorelines of Canada, the United States, and Europe.

We turn now to seaweed supplement which is seaweed extract.

Seaweed extract is water soluble and can be obtained by alkaline hydrolysis extraction. A preferred seaweed extract is obtained by alkaline hydrolysis extraction from Ascophyllum nodosum; commercial products of this kind are available from Acadian Seaplants Limited of Nova Scotia Canada, and are sold under the tradenames Acadian Soluble Seaweed Extract Powder (powder form), Acadian Liquid Seaweed Concentrate (liquid form), Tasco™-Ex(powder form) and Tasco™-Forage (powder form). Acadian Soluble Seaweed Extract Powder, Tasco™-Ex and Tasco™-Forage have the same composition. Acadian Soluble Seaweed Extract Powder is made up of brownish-black crystals, has a seaweed-like odor, is 100% soluble in water and has a pH of 10–10.5 in water and typical analysis shows by weight 6.5% maximum moisture, 45–55% organic matter, 45–55% ash (minerals), 1.0–2.0% total nitrogen (N), 2.0–4.0% available phosphoric acid ($P_2O_5$), 18.0–22.0% soluble potash ($K_2O$), 1.0–2.0% suliur (S), 0.2–0.5% magnesinm, 0.1–0.2% calcium, 3.0–5.0% sodium, 75–150 ppm boron, 75–250 ppm iron, 8–12 ppm manganese, 1–10 ppm copper, 25–75 ppm zinc; alginic acid, mannitol, and laminarin carbohydrates; cytokinin, auxin and gibberellin growth promoters; and the following average grams of amino acid per 100 grams of protein: alanine, 3.81; arginine, 0.22; aspartic acid, 5.44; cystine, trace; glutamic acid, 7.69; glycine, 3.16; histidine, 0.42; isoleucine, 1.94; levcine, 4.84; lysine, 1.33; methonine, 1.39; phenylalanine, 2.82; proline, 4.42; serine, 0.14; threonine, 1.27; tyrosine, 1.80, and valine, 3.46.

We turn now to seaweed supplement which is seaweed meal or flour.

The seaweed meal or flour can be obtained by dehydrating the seaweed, for example, by solar drying followed by low heat finish drying and processing the dehydrated material into a granular meal or flour. A preferred seaweed meal is obtained from *Ascophyllum nodosum* and is available from Acadian Seaplants Limited of Nova Scotia, Canada, and is sold under the tradenames Acadian Kelp Meal and Tasco™-14. Acadian Kelp Meal and Tasco™-14 have the same composition. A typical analysis of Acadian Kelp Meal shows the following approximate weight percentages: moisture 12.0%, crude protein 6.0%, crude fiber 6.0%, ash (minerals) 22.0%, fat 20%, and carbohydrates 52.%. Analysis of Acadian Kelp Meal for carbohydrates gives by weight 18.0–27.0% alginic acid, 3.8–8.0% mannitol, 2.0–5.0% laminarin, and 20.0–22.0% other sugars. Analysis of Acadian Kelp Meal for minerals gives 50–150 ppm aluminum, 5–15 ppm barium, <1 ppm beryllium, 80–100 ppm boron, <1 ppm cadmium, 1.0–3.0% calcium, 1.0–3.0% chloride, 1–2 ppm chromium, <1 ppm cobalt, 1–10 ppm copper, <1,000 ppm iodine, 100–500 ppm iron, <1 ppm lead, 0.5–1.0% magnesium, 10–50 ppm manganese, <1 ppm mercury, <2 ppm molybdenum, <1 ppm nickel, 0.5–2.0% nitrogen, 0.1–0.2% phosphorus, 1.5–2.5% potassium, 3–4 ppm selenium, 2.4–4.0% sodium, 100–600 ppm strontium, 2.0–3.0% sulfur, <10 ppm tin, 1–10 ppm titanium, 2–6 ppm vanadium and 10–50 ppm zinc. Analysis of Acadian Kelp Meal for vitamins gives 0.1–0.4 ppm biotin, 30–60 ppm carotene, 0.1–0.5 ppm folic acid, 0.1–0.5 ppm folinic acid, 10–30 ppm niacin, 5–10 ppm riboflavin, 1–5 ppm thiamin, 150–300 ppm tocopherols, 100–2,000 ppm vitamin C,<0.004 ppm vitamin $B_{12}$, and <10 ppm vitamin K. Analysis of the amino acid content for Acadian Kelp Meal gave the following expressed as grams of amino acid per 100 g of protein nitrogen: alanine 5.3, arginine 8.0, aspartic acid 6.9, cystine (trace), glycine 5.0, glutarnic acid 10.0, histidine 1.3, isoleucine 2.8, leucine 4.6, ulysine 4.9, methionine 0.7, phenylalanine 2.3, proline 2.6, serine 3.0, threonine 2.8, tryptophan (trace), tyrosine 0.9, and valine 3.7.

We turn now to the embodiment of the invention directed to a method of obtaining beef of reduced pathogenic *E. coli* content which comprises the steps of: (a) directly feeding seaweed supplement to cattle during the feedlot finishing period of the life cycle of beef production; (b) slaughtering the cattle and obtaining meat; and (c) analyzing for pathogenic *E. coli* content in samples of the meat; thereby to obtain and demonstrate the presence of beef of reduced pathogenic *E. coli* content compared to if seaweed supplement were not fed. This embodiment is denoted the first embodiment.

The seaweed supplement for the first embodiment is that described above and preferably is seaweed extract obtained by extraction of *Ascophyllum nodosum*.

We turn now to feeding of the seaweed supplement for the first embodiment. It is included in diet in amount of; e.g., about 0.01 to about 5%, by weight, e.g., 0.1 to 3%, by weight (powder or concentrate extract or meal). Where the seaweed supplement is seaweed extract, the seaweed extract is preferably admixed into diet for direct feeding by inclusion at the time of feeding by top dressing or by mixing into the feed at the time of feeding or by premixing at the time the diet ingredients are combined. Where the seaweed supplement is seaweed meal, the seaweed meal can be admixed into diet by inclusion at the time the diet ingredients are mixed or by directed addition at the time of feeding.

As indicated above, for the first embodiment, seaweed supplement is fed to cattle during the feedlot finishing period of the life cycle of beef production. The diet for feedlot finishing other than seaweed supplement can be one that is typical of feedlot finishing diets, e.g., a diet based on steamflaked milo (*Sorghum bicolor*) and cottonseed hulls (*Gossipium hirsutum*); however, the diet for feedlot finishing may also or alternatively be based on other ingredients including corn (*Zea mays*), wheat (*Triticum aestivum*), barley (*Hordeum vulgare*) or other grains, especially corn. The feeding of seaweed supplement can be during the whole of the feedlot finishing period or part thereof, e.g., for at least 10 days of the feedlot finishing period. Preferably the feeding of seaweed supplement is for 10 to 20 days, e.g., for 14 days, at the end of the feedlot finishing period.

For the first embodiment herein, the slaughtering and obtaining meat of step (b) can be carried out in conventional fashion.

For the first embodiment herein, the analysis of step (c) can be carried out with the same frequency as is conventional for *E. coli* analysis on beef For example, conventionally ground beef is tested in processing facilities for *E. coli* O157:H7 on a random basis at least once quarterly, and carcasses at slaughter are checked for *E. coli* O157:H7 on a random basis at least once quarterly. If the presence of *E. coli* O157:H7 is suspected, the testing could occur more frequently but there is no definite number of times. Analysis for pathogenic *E. coli* content of beef (in slaughtered carcasses and ground meat) can be carried out as described in Vanderzant, C., et al., Compendium of Methods of Microbiological Examination of Feed, 3rd edition, American Public Health Association, Chapter 24 (1992) or in Holt, J. G., Bergey's Manual of Determinative Bacteriology, $9^{th}$ edition (1994).

We turn now to the embodiment of the invention directed to a method of obtaining beef of reduced pathogenic *E. coli* content which comprises the steps of (a) grazing cattle on forage on or into which seaweed supplement has been incorporated; (b) slaughtering the cattle and obtaining meat; and (c) analyzing for pathogenic *E. coli* content in samples of the meat; thereby to obtain and demonstrate the presence of beef of reduced pathogenic *E. coli* content compared to if seaweed supplement is not fed. This embodiment is denoted the second embodiment.

The forage for the second embodiment is pasture forage and can be any forage suitable for grazing of cattle. One important forage is tall fescue (*Festuca arundinacea* Schreb) which is grown on over 14 million hectares of land in the United States. Other forages include, for example, orchard grass (*Dactylis glomerata* L.), bluegrass (*Poapratenisis* L.), bermudagrass (*Cynodon dactylon* L.), and ryegrass (Lolium spp.). The forage can be endophyte fungus infected. The fungus helps the plant tolerate stresses such as drought and insects. Endophyte fungus which infects tall fescue is *Neotyphodium coenophialum*. Endophyte fuigus which infects ryegrass is *Acremonium lolii*.

The seaweed supplement for step (a) of the second embodiment is that described above and preferably is seaweed extract obtained by extraction of *Ascophyllum nodosum*. When the seaweed supplement is seaweed extract, the seaweed extract is preferably applied to pasture forage as a water solution at the beginning of the grazing season and in the middle of the grazing season. The seaweed extract can be applied, for example, in an amount ranging from 0.3 kg/ha to 5 kg/ha, e.g., 1 to 4 kg/ha, and an application amount of 3.4 kg/ha (3 lbs/acre) has been used with good advantage. The seaweed extract (powder form) is readily dissolved in 20 to 40 gallons of water per acre. Application is preferably carried out by spraying the water solution on the pasture forage using a commercial field-type of sprayer. When the seaweed supplement is seaweed meal, the seaweed meal is preferably applied to a pasture to provide seaweed treated forage by application in dry form and solubles from seaweed meal dissolve after application so that the solubilized material is available for foliar uptake and/or leaches into the ground and is taken up by the forage. The seaweed meal can be applied, for example, in an amount of 0.3 to 10 kg per acre.

For the second embodiment, the cattle preferably are grazed on the seaweed extract treated pasture forage for 100 to 210 days (e.g., 180 to 200 days) in the spring and summer seasons in the year after birth and then are preferably feedlot finished over a period ranging from 75 to 200 days, e.g., 130 to 160 days. The feedlot finishing can be the same as that described for the first embodiment or can be conventional.

For the second embodiment herein, the slaughtering and obtaining meat of step (b) can be carried out in conventional fashion.

For the second embodiment, the analysis of step (c) can be carried out the same as in step (c) of the first embodiment.

The invention is illustrated by the following working example.

EXAMPLE

Forty-eight steers were fed a diet containing 0, 1% or 2% by weight Tasco-Ex (16 in each group) during the feedlot phase for two weeks before slaughter. The feedlot finishing phase constituted a period of about 120 days. Diets coded SER1, SER2 and SER3 were fed in succession for about two weeks each during the initial portion of the finishing period as the receiving and intermediate diets as the cattle were adjusted to the feedlot. After that and until the end of the feedlot phase, a diet denoted SER4 was fed and, as indicated above, for the last two weeks of the feedlot phase, the diet also contained 0%, 1% or 2% by weight Tasco-Ex. The SER1 diet consisted by weight of 44.7 steam flaked corn, 23.8% cottonseed hulls, 14.4% ground alfalfa hay, 2.21% supplement premix, 6.64% cottonseed meal, 0.55% urea, 2.5% fat, and 5.2% cane molasses. The SER2 diet consisted by weight of 56.7% steam flaked corn, 14.2% cottonseed hulls, 14.2% ground alfalfa hay, 0.82% urea, 3.73% cottonseed meal, 0.48% ground milo control, 2.17% supplement premix, 2.6% fat, and 5.1% cane molasses. The SER3 diet consisted by weight of 65.4% steam flaked corn, 9.8% cottonseed hulls, 9.8% ground alfalfa hay, 3.9% cottonseed meal, 0.85% urea, 2.25% supplement premix, 2.7% fat, and 5.3% cane molasses. The SER4 diet consisted by weight of 75.3% steam flaked corn, 4.9% ground alfalfa hay, 4.9% cottonseed hulls, 3.81% cottonseed meal, 0.84% urea, 2.25% supplement premix, 2.7% fat, and 5.3% cane molasses. The supplement premix consisted by weight (dry matter basis) of 23.97% cottonseed meal, 42.11% high-Ca limestone, 1.04% dicalcium phosphate, 8% potassium chloride, 3.56% magnesium oxide, 6.67% ammonium sulfate, 12% salt, 0.0018% cobalt carbonate, 0.16% copper sulfate, 0.13% iron sulfate, 0.0025% ethylenediaminedihydroiodide, 0.27% manganous oxide, 0.1% selenium premix (0.2%), 0.83% zinc sulfate, 0.012% vitamin A (650,000 International Units per kg), 0.126% vitamin E (500 International Units per kg), 0.67% Rumensin-80 (80 grams rumensin per 1 b. of Rumensin-80), and 0.36; % Tylan-40 (40 grams of Tylan per lb. of Tylan-40).

Slaughter was carried out and analyses for *E. coli* (all strains) and for *E. coli* strain O157:H7 were carried out on fecal and hide samples from all the steers, both before and after slaughter. In the analyses, one (1) was assigned if *E. coli* was absent and two (2) was assigned if *E. coli* was present and the results for each group were averaged.

Analyses on fecal samples were carried out as follows:

Twenty grams of fecal sample is collected and taken to the laboratory within 4 hours. Ten grams of each fecal sample is incubated with enrichment medium for 6 hours at 37° C. Following the incubation period, 1 ml of enriched sample is added to 20 $\mu$l Dynal anti-O157 magnetic beads (Dynal Corp.) in a capped test tube and incubated at room temperature for 30 min. Dyna-bead bacterial complex is re-suspended in wash buffer and plated on McConkey sorbital agar+cefixie and potassium telunite, and incubated for 24 hours at 37° C. O agglutination (O157) tests are performed on typical colonies (clear colonies). Agglutinating colonies are inoculated on trptic soy agar (TSA) and motility plates and incubated for 24 hrs at 35° C. and 32° C., respectively. Colonies collected from motility plates are used to inoculate brain and heart infusion (BHI tubes that are incubated at 32° C. for 24 hrs). Colonies isolated from motility and O agglutination tests are transferred to API 20E test strips (BioMerieux Vitek, St. Louis, Mo.) and read according to manufacturers recommendations. H agglutination (H7) tests are performed using a sample of the brain and heart infusion (BHI) broth. These combined procedures allow the determination of the species and pathogenicity of detected *E. coli*.

Analyses on hide samples were carried out as follows: The same procedure was used as on fecal samples, except that instead of 20 grams of fecal sample being collected, a sponge was used to swipe the hide and then the presence of organisms on the sponge was determined using the same procedures recited above for analysis in respect to fecal samples.

Figure 3:
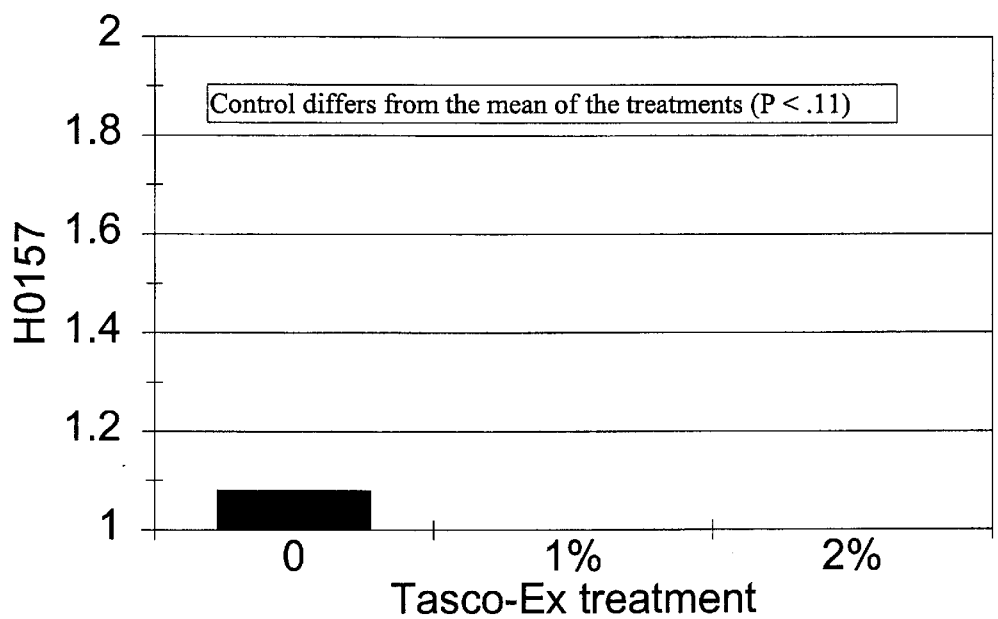
FIG. 3 is a graphic presentation of effect of feeding of seaweed extract on fecal E. coli O157:H7 content and shows results of Example I.

The results for *E. coli* (all strains) on fecal samples are shown in FIG. 1. As shown in FIG. 1, a linear effect (decrease in fecal *E. coli* content with Tasco-Ex treatment) was obtained ($P<0.02$). The results on fecal samples for *E. coli* (strain O157:H7) are shown in FIG. 3. As shown in FIG. 3, no O157:H7 was found in the groups treated with Tasco-Ex and the control differed from the mean of the treatments ($P<0.11$).

Figure 2:
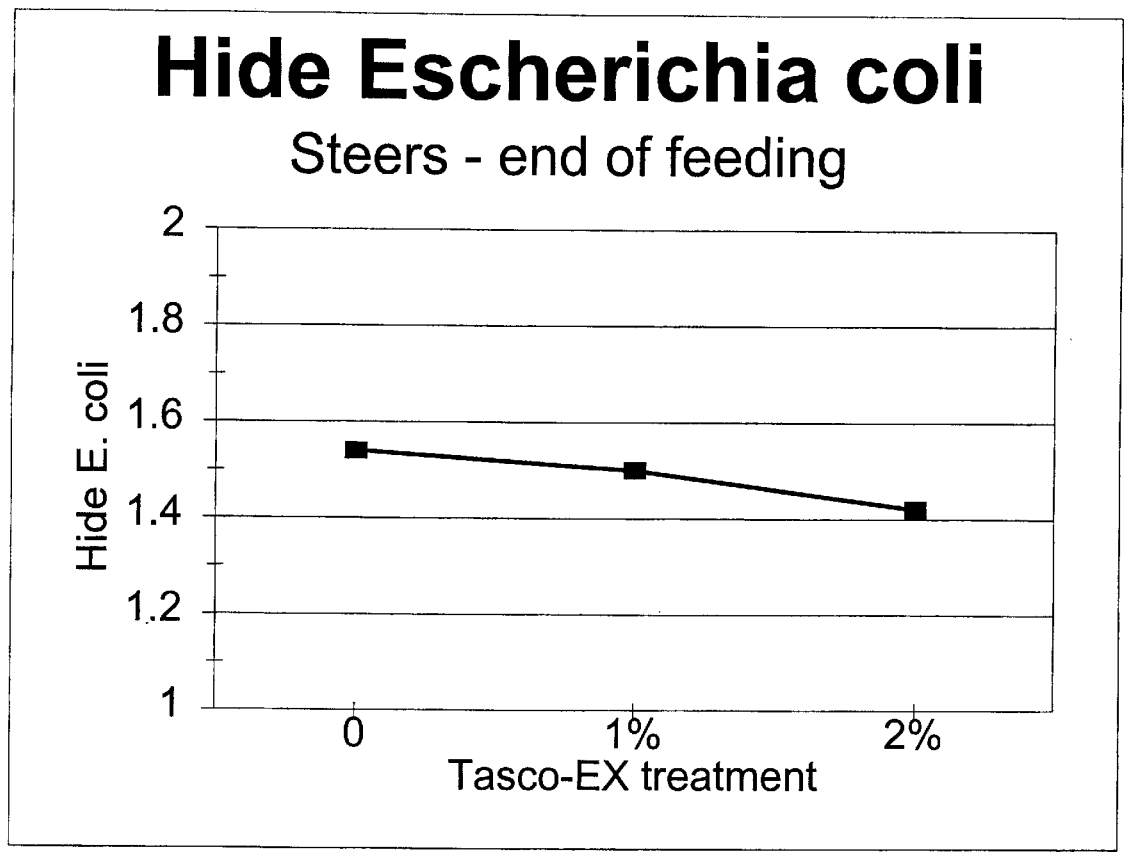
FIG. 2 is a graphic presentation of effect of feeding of seaweed extract on hide E. coli content and shows results of Example I.
Figure 4:
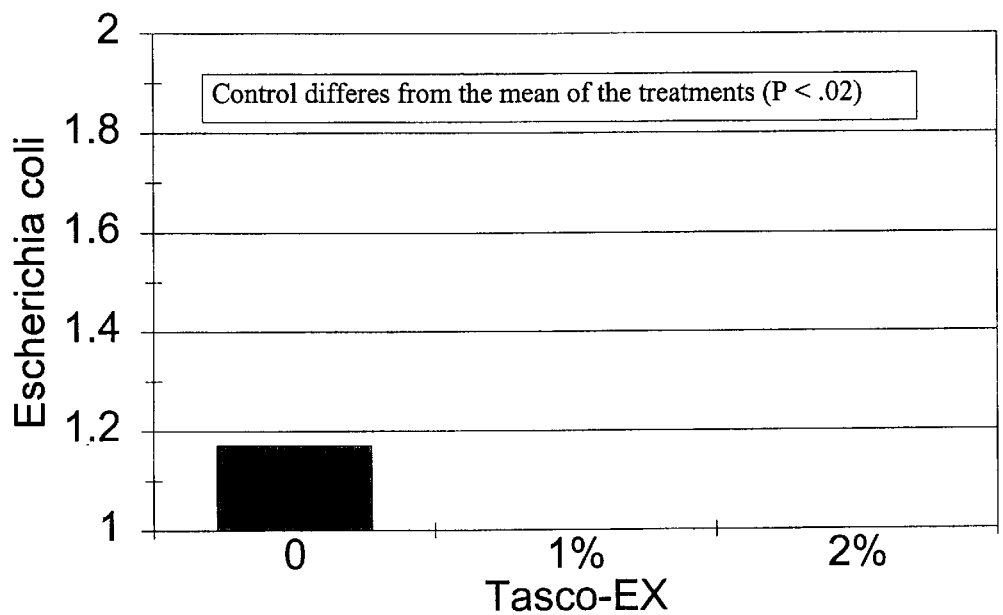
FIG. 4 is a graphic presentation of effect of feeding of seaweed extract on hide E. coli O157:H7 content and shows results of Example I.

The results for *E. coli* (all strains) on hide samples are shown in FIG. 2. FIG. 2 shows decrease in hide *E. coli* with Tasco-Ex treatment. The results for *E. coli* (strain O157:H7) are shown in FIG. 4. As shown in FIG. 4, no O157:H7 was found in the groups treated with Tasco-Ex and the control differed from the mean of the treatments ($P<0.02$).

In data using an enumeration method, the actual levels of colifonms and *E. coli*, in the feces as enumerated with *E. coli* Petrifilm™, were not different among treatments ($P<0.05$); this data does not detract from a conclusion based on the data of FIGS. 1–4 that seaweed supplement administration causes reduced pathogenic *E. coli* content in beef and reduced *E. coli* content in general (since the procedures used for the data of FIGS. 1 and 2 were more sensitive for *E. coli* in general than were the procedures of the enumeration method).

After slaughter analysis on samples of meat show pathogenic *E. coli* reduction in meat from steers treated with seaweed supplement.

Similar results of reduced pathogenic *E. coli* content in beef are obtained when cattle graze on pasture forage (endophyte infected tall fescue) treated with Tasco-Ex at 3 lb/acre in the beginning at in the middle of the grazing season and seaweed supplement is fed or is not fed during feedlot finishing.

Variations

Many variation of the above will be obvious to those skilled in the art. Thus, the invention is defined by the claims.

What is claimed is:

1. A method of obtaining beef of reduced pathogenic *E. coli* content comprising the steps of:
    (a) directly feeding seaweed supplement to cattle during the feedlot finishing period of the life cycle of beef production;
    (b) slaughtering the cattle and obtaining meat; and
    (c) analyzing for pathogenic *E. coli* content in samples of the meat;
    thereby to obtain and demonstrate the presence of beef of reduced pathogenic *E. coli* content compared to if seaweed supplement were not fed.

2. The method of claim 1, where the seaweed supplement is fed for 10 to 20 days at the end of the feedlot finishing period.

3. The method of claim 2, where the seaweed supplement is fed in an amount ranging from about 0.01 to 5% by weight of diet.

4. The method of claim 3, where the seaweed supplement is from *Ascophyllum nodosum*.

5. The method of claim 4, where the seaweed supplement is seaweed extract which is water soluble and is obtained by a method comprising alkaline hydrolysis extraction of *Ascophyllum nodosum*.

6. The method of claim 4, where the seaweed supplement is seaweed meal.

7. The method of claim 1 where the pathogenic *E. coli* analyzed for and reduced in content comprise strain O157:H7.

8. A method of obtaining beef of reduced pathogenic *E. coli* content comprising the steps of
    (a) grazing cattle on forage on or into which seaweed supplement has been incorporated;
    (b) slaughtering the cattle and obtaining meat; and
    (c) analyzing for pathogenic *E. coli* content in samples of the meat;
    thereby to obtain and demonstrate the presence of beef of reduced pathogenic *E. coli* content compared to if seaweed supplement were not fed.

9. The method of claim 8, wherein the forage is tall fescue grass.

10. The method of claim 8 where the pathogenic *E. coli* analyzed for and reduced in content comprise strain O157:H7.

11. The method of claim 8 where the seaweed supplement is incorporated by application of seaweed meal onto the forage.

12. The method of claim 8, wherein the seaweed supplement is incorporated by application of seaweed extract onto the forage.

13. The method of claim 12, wherein the seaweed extract is water soluble and is obtained by a method comprising alkaline hydrolysis extraction of *Ascophyllum nodosum*.

14. The method of claim 13, wherein the forage is tall fescue grass.

15. The method of claim 14, wherein the tall fescue grass is infected with an endophyte fungus.

16. The method of claim 15, wherein the endophyte fungus is *Neotyphodium coenophialum*.

* * * * *